(12) United States Patent
Gammenthaler, Jr. et al.

(10) Patent No.: US 8,565,095 B2
(45) Date of Patent: Oct. 22, 2013

(54) CONTEXT CONTROLLED DATA TAP UTILIZING PARALLEL LOGIC FOR INTEGRATED LINK MONITORING

(75) Inventors: Robert S. Gammenthaler, Jr., Frisco, TX (US); Jace Files, Plano, TX (US)

(73) Assignee: Alcatel Lucent, Paris (FR)

( * ) Notice: Subject to any disclaimer, the term of this patent is extended or adjusted under 35 U.S.C. 154(b) by 1014 days.

(21) Appl. No.: 11/315,512

(22) Filed: Dec. 22, 2005

(65) Prior Publication Data
US 2006/0250971 A1    Nov. 9, 2006

Related U.S. Application Data

(60) Provisional application No. 60/672,796, filed on Apr. 19, 2005, provisional application No. 60/675,795, filed on Apr. 19, 2005.

(51) Int. Cl.
*H04J 3/14*    (2006.01)

(52) U.S. Cl.
USPC .......................................... 370/241

(58) Field of Classification Search
USPC ......... 370/241, 254, 474, 475, 476, 477, 522, 370/528, 354, 366; 379/35, 221.09, 221.1, 379/221.11; 709/223; 455/424, 426, 426.1; 711/113

See application file for complete search history.

(56) References Cited

U.S. PATENT DOCUMENTS

| | | | |
|---|---|---|---|
| 4,726,019 A * | 2/1988 | Adelmann et al. | 370/474 |
| 6,275,696 B1 * | 8/2001 | Paik | 455/426.1 |
| 6,717,940 B1 * | 4/2004 | McGrew | 370/354 |
| 2006/0084429 A1 * | 4/2006 | Buvaneswari et al. | 455/424 |
| 2006/0117137 A1 * | 6/2006 | Matsuba et al. | 711/113 |
| 2006/0153177 A1 * | 7/2006 | Worrall et al. | 370/366 |
| 2007/0073822 A1 * | 3/2007 | Bennett et al. | 709/206 |
| 2011/0188474 A1 * | 8/2011 | Indirabhai | 370/331 |

* cited by examiner

*Primary Examiner* — Andrew Lai
*Assistant Examiner* — Leon Andrews
(74) *Attorney, Agent, or Firm* — RGIP LLC

(57) ABSTRACT

A system, method, and computer readable medium for context controlled data tapping utilizing parallel logic for integrated link monitoring including receiving a signal unit, indexing to a state associated with a current channel to determine a current context of the signal unit in parallel to host processing and assigning a bundle overhead associated with the signal unit.

20 Claims, 4 Drawing Sheets

CONTEXT CONTROLLED DATA TAP UTILIZING PARALLEL LOGIC FOR INTEGRATED LINK MONITORING

CROSS REFERENCE TO RELATED APPLICATIONS

The present patent application is related to and claims the benefit of provisional patent application No. 60/672,796, filed on Apr. 19, 2005, entitled CONTEXT-CONTROLLED DATA TAP UTILIZING PARALLEL HARDWARE LOGIC FOR LINK MONITORING, and to provisional patent application No. 60/672,795, filed on Apr. 19, 2005, entitled TIME STAMP OFFSET IN DATA PACKET BUNDLING, the entire contents of which are enclosed by reference herein, each of which is assigned to the assignee of the present invention.

The present patent application is also related to commonly assigned U.S. patent Application 60/672,795 entitled TIME STAMP OFFSET IN DATA PACKET BUNDLING, filed on even date herewith, the entire contents of which are incorporated by reference herein.

BACKGROUND OF THE INVENTION

The present invention is generally related to virtually tapping transmit and receive data links utilized for signaling servers and, more specifically to a context controlled data tap utilizing parallel logic for integrated link monitoring.

Currently, interactively coupling signaling servers to data capture systems requires a multitude of passive taps to monitor message traffic level 2 information. Level 2 information includes components such as sequencing and error checking. An Integrated Link Monitor (ILM) can provide interactive coupling of the signaling server to a data capture system for monitoring message traffic. The signaling server can be of the Signaling System #7 (SS7) type such as the Alcatel Signaling Server Global (SSG) system. Integrated link monitor coupling of the signal server to the data capture system replaces the multitude of passive taps on each of the signaling server links that were previously used to accomplish this purpose. The information previously received by means of the passive taps is now provided by a series of Ethernet connections. Current integrated link monitoring functions that have been implemented in hardware performs the level 2 functions but require the host processor utilization to perform those functions. The use of the host processor to perform level 2 functions adds significant load to the host processor and reduces its availability to perform distributed application services.

Therefore, what is needed is parallel logic to virtually tap the signaling server message traffic to extract level 2 information and perform level 2 functions. More specifically, parallel logic is needed to perform a virtual tap of context-controlled transmit and receive data links to extract level 2 information and perform the level 2 functions. The level 2 functionality is implemented by means of the integrated link monitor which aligns signal units based on context and copies those signal units to the Direct Memory Access (DMA) function which assembles the integrated link monitor data packet bundles in host memory.

SUMMARY OF THE INVENTION

The Integrated Link Monitor (ILM) is used for interactive coupling of the signaling server to the data capture system for monitoring message traffic. The signaling server can be a Signaling System #7 (SS7) system such as the Alcatel Signaling Server Global (SSG). The present invention provides a virtual tap of context-controlled transmit and receive data to extract level 2 information to send to the data capture system.

The data capture system can be external monitoring equipment such as third party processors. Level 2 information includes sequencing and error checking information. Virtually tapping transmit and receive data links allows level 2 information to be gathered to align Signal Units (SU) based on context. Aligned signal units are copied to a Direct Memory Access (DMA) control function for assembling ILM data packet bundles in host memory.

A context controlled level 2 state machine extracts the level 2 information and performs level 2 functions. This extraction of level 2 information and performance of level 2 functions is implemented by means of parallel logic. The context of the transmit and receive data link is loaded based on the availability of an input for the data link. Inputs consist of link control from a controlling entity and requests to generate transmit data or requests to process receive data. The input is applied to the level 2 state machine which utilizes the current input and context loaded state to produce the next state and associated outputs. The level 2 processing is performed real-time or near real-time for the input.

The integrated link monitor provides a parallel logic path to copy transmit and receive data. Utilizing visibility into the state of the current context, signal unit alignment is maintained for the copied data. A direct memory access function collects the copied signal units provided from each context of the level-2 state machine, and generates an associated bundle overhead. The bundle overhead includes information necessary to decode and unbundle the data, identify the source of the data, sequence the data from a given source, and time stamp the data for correlation across multiple monitored entities.

In one embodiment, a method for context controlled data tapping utilizing parallel logic for integrated link monitoring includes receiving a signal unit, indexing to a state associated with a current channel to determine a current context of the signal unit in parallel to host processing and assigning a bundle overhead associated with the signal unit.

In yet another embodiment, a method for context controlled data tapping utilizing parallel logic for integrated link monitoring including receiving a signal unit, indexing to a state associated with a current channel to determine a current context of the signal unit, the determination being performed in parallel to host processing, extracting level 2 data from the signal unit, executing level 2 functions, aligning the signal unit based upon the state of the current context, copying the aligned signal unit to a direct memory access control function, collecting the signal unit, assigning bundle overhead associated with the signal unit, loading the context of the signal unit based upon the availability of a link input, wherein link inputs are comprised of requests from a controlling entity, wherein link inputs are comprised of requests to generate a transmit signal unit, wherein link inputs are comprised of requests to process a receive signal unit, producing a state machine output based upon the link input and the current context of the state signal, assembling an integrated link monitor data packet bundle, and storing the integrated link monitor data packet bundle in host memory.

In another embodiment, a combined context controlled data tap and parallel logic system for integrated link monitoring including a tap receiving a signal unit, and a state machine coupled to the tap, the state machine adapted to receive a signal unit input and to determine current context of the signal unit, the state machine producing a subsequent state based on the signal unit input and current context of the signal unit.

In a further embodiment, a computer readable medium including instructions for indexing to a state associated with a current channel to determine a current context of the signal unit, aligning the signal unit based upon the current context, assigning bundle overhead associated with the signal unit, copying the aligned signal unit to a direct memory access control function, and bundling an integrated link monitor data packet in host memory.

DETAILED DESCRIPTION OF THE INVENTION

Figure 1:
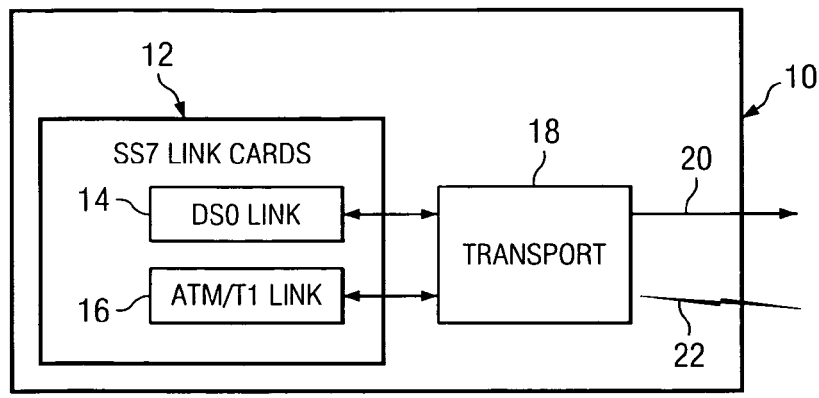
FIG. 1 depicts an SS7 system in accordance with a preferred embodiment of the present invention.

Referring now to FIG. 1, a Signaling System #7 (SS7) 10 is shown, an SS7 link card 12 including in one embodiment a Digital Signal Level 0 (DS-0) link card 14 and an Asynchronous Transfer Mode (ATM) T-1 link card 16 connected to a message transport network 18 such as an Ethernet which can communicate with a data capture system by a Local Area Network (LAN) line 20 or a wireless 22 connection that comprise the number of blocks or modules. The link card may also include a Message Transfer Part 2 (MTP-2) link card on channelized or unchannelized T-1 or E-1, a Stream Control Transmission Protocol (SCTP) link card or any of a variety of digital link cards. These blocks or modules are software, hardware, firmware, and/or the combination of software, hardware, and/or firmware. The SS7 link cards 12 provide parallel processing for an Integrated Link Monitor (ILM). The integrated link monitor is used for interactive coupling of the signaling server, SS7 system, to the data capture system for monitoring of SS7 message traffic. The transfer of information between the message transport network 18 and the data capture system occurs via at least one of a wireless protocol, a wired protocol and the combination of the wireless protocol and the wired protocol.

The present invention provides stamping a set of individual Signal Units (SU) with a time offset representing the difference in time between a globally distributed time and a local time the signal unit was written to a refill portion associated with a circular buffer. The ILM extracts data from a monitored transmit and receive link. This monitored data must be correlated in time with data from across a global network. Time information is distributed globally throughout the network. This globally distributed time must then be inserted into the monitored data for time correlation of individual monitored signal units across the global network.

The ILM receives the globally distributed time and fills a globally distributed time stamp of an ILM data packet bundle. A host processor and the ILM exchange monitored packets through the circular buffer. ILM data packet bundles are assembled in the refill portion of the circular buffer by the ILM and a release portion of the circular buffer is released to the host processor for network transmission. The ILM then begins filling the refill portion of the circular buffer in real-time, near real-time, contemporaneously or independently to transmission of the release portion of the circular buffer by the host processor. To resolve the separation of the globally distributed time and a local time tracked by the ILM, a timer algorithm was developed to track time based on the release and refill operations of the circular buffer.

When the refill portion of the circular buffer is transferred to the ILM, a bundle overhead is stamped with the globally distributed time. In real-time, near real-time, contemporaneously or independently, the ILM is informed of the availability of the refill portion of the circular buffer. The ILM begins updating the time offset for this refill portion of the circular buffer. As each signal unit is appended to the circular buffer, the time offset is inserted into the bundled data stream along with the monitored signal unit. The data capture system can then compute the globally distributed time for each signal unit by adding the time offset for the signal unit to the globally distributed time provided in the bundle overhead.

The ILM virtually taps the transmit and receive data links to allow alignment of the series of signal units. Aligned signal units are copied to a Direct Memory Access (DMA) control function for assembling ILM data packet bundles in the refill portion of the circular buffer in host memory. A context controlled level 2 state machine extracts the level 2 information and performs level 2 functions such as sequencing and error checking. A context of the associated link is loaded based on the availability of an input for the link. Inputs consist of a link control from the host processor which acts as a controlling entity and a request to generate transmit data or a request to process receive data. The input is applied to the level 2 state machine which utilizes the current input and the context loaded state to produce the next state and associated outputs. The processing is performed real-time or near real-time for the associated input. The integrated link monitoring function provides a parallel logic path to copy transmit and receive ILM data packet bundles. Utilizing visibility into the state of the current context, signal unit alignment is maintained for the copied data. The direct memory access function collects the copied signal units provided from each context of the level 2 state machine, and generates bundle overhead required to decode and unbundle the data, identify the source of the data, sequence the data from the given source, and time stamp the data for correlation across multiple monitored entities.

The system adapted to provide time stamp offset in data packet bundling, having the link card module. The link card module may comprise a DS-0 link card and the ATM/T1 link card, a message transfer part 2 link card on channelized or unchannelized T-1 or E-1, a stream control transmission protocol link card or any of a variety of digital link cards. The link card module having an integrated link monitor adapted to receive the signal unit and the globally distributed time stamp and the timer coupled to the integrated link monitor. The timer is adapted to resolve a difference in time between the reception of the signal unit and the globally distributed time stamp. The integrated link monitor executes operations in parallel to the host processor. The message transport network is adapted to transfer information between the link card module and the data capture system, the transfer of the information occurs via at least one of the wireless protocol, the wired protocol and a combination of the wireless protocol and the wired protocol. A management processor is adapted to transfer information between at least one of the message transport network and the data capture system.

Figure 2:
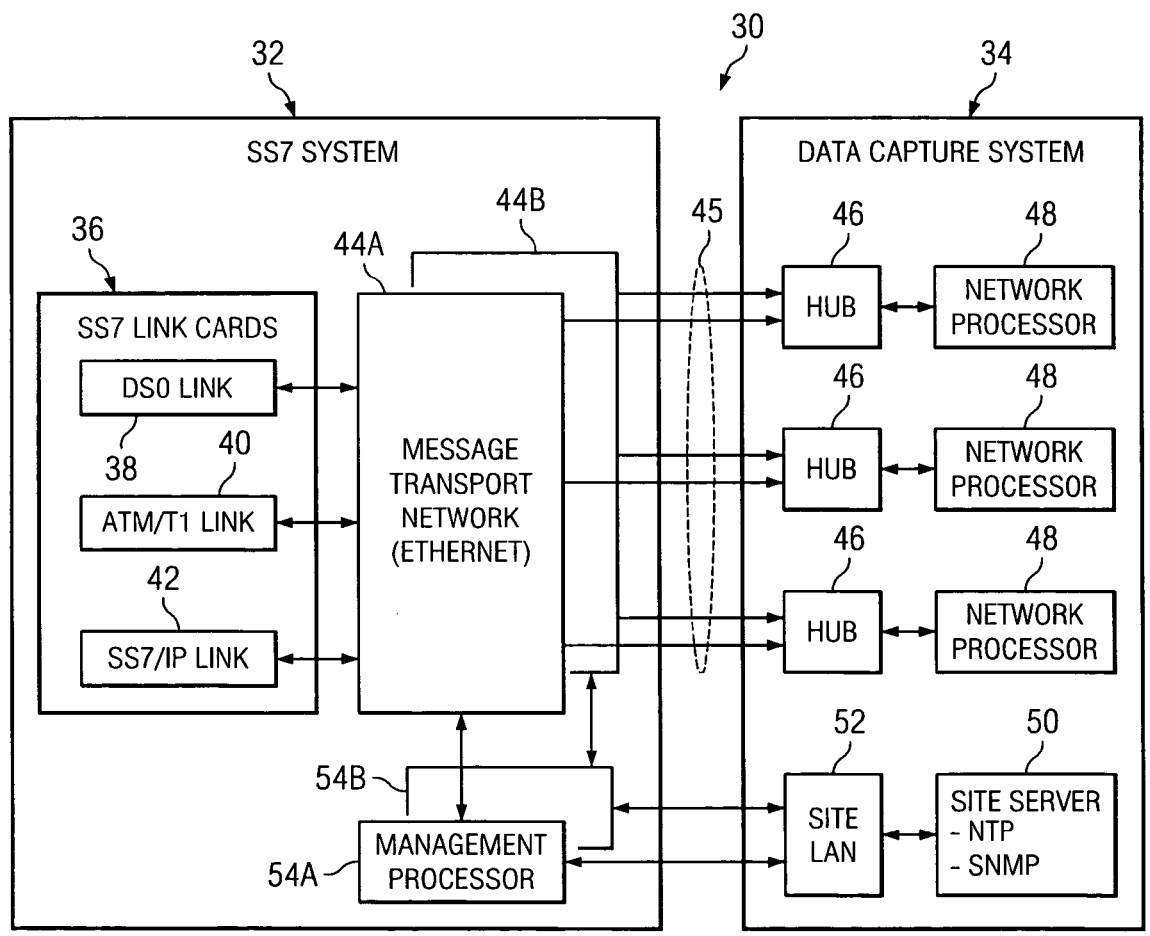
FIG. 2 depicts an SS7 system coupled to a data capture system in accordance with a preferred embodiment of the present invention.

Referring now to FIG. 2, the SS7 system 32 coupled to the data capture system 34 that comprise the number of blocks or modules. These blocks or modules are software, hardware, firmware, and/or the combination of software, hardware, and/or firmware. The SS7 link card 36 is shown, and may include a DS-0 link 38 and an ATM/T-1 link 40 with and an SS7 Internet Protocol (IP) link 42 coupled to the message transport network such as the Ethernet 44a and 44B. The link card may include a message transfer part 2 link card on channelized or unchannelized T-1 or E-1, a stream control transmission protocol link card or any of a variety of digital link cards. The management processors 54A and 54B are connected to the message transport network 44A and 44B which can communicate with the data capture system 34 via the local area network 52. The management processors are responsible for transmitting link status, link configuration and system status to the data capture system 34. The blocks in the SS7 system 32 perform the similar functionality to their respective blocks in the SS7 system 10. The message transport network 44A and 44B are coupled to management processors 54A and 54B. Globally distributed time is received across the site LAN 52. The management processor 54A and 54B synchronize time utilizing the globally distributed time provided by a first server 50. The hub 46 is coupled 45 to the message transport network 44A and 44B, the hub 46 is also connected to the network processor 48.

Figure 3:
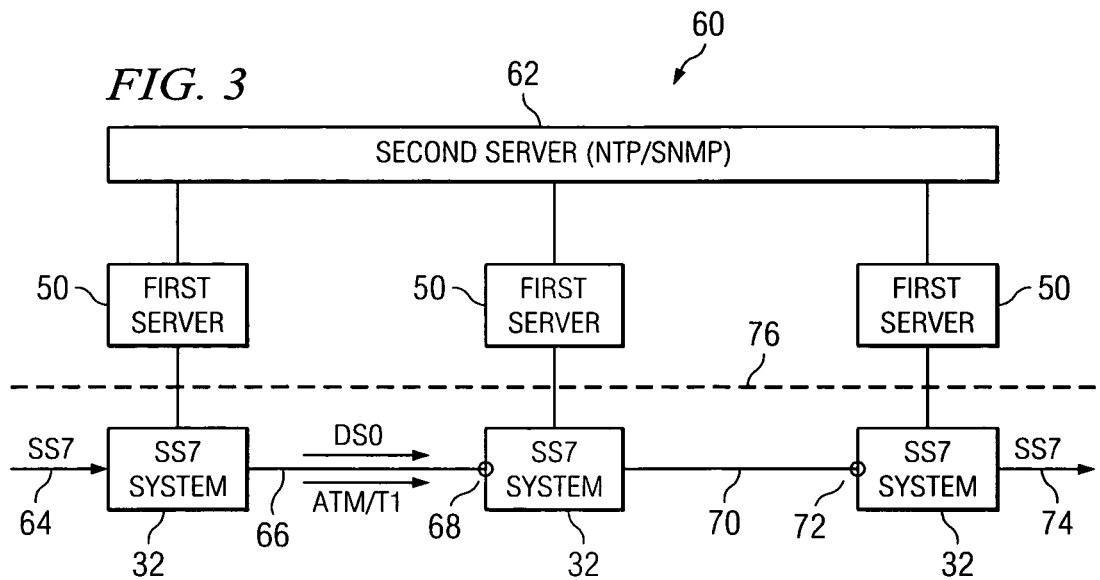
FIG. 3 depicts an SS7 system coupled to servers in accordance with a preferred embodiment of the present invention.

Referring now to FIG. 3, the SS7 system is shown coupled to the first servers 50, which in turn are coupled to the second server 62 that comprise the number of blocks or modules. These blocks or modules are software, hardware, firmware, and/or the combination of software, hardware, and/or firmware. The SS7 system 32 is connected by links 64, 66, 70 and 74 to the message transport network. A set of monitoring links 68 and 72 provide virtual taps to extract transmit and receive level 2 information to be received by the data capture system.

Figure 4:
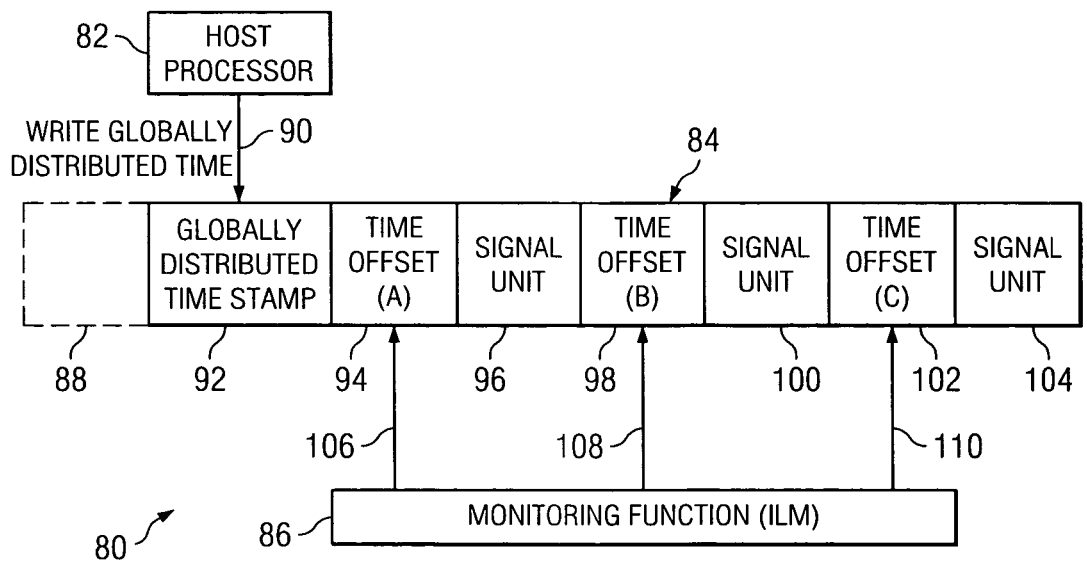
FIG. 4 depicts an integrated link monitor in accordance with a preferred embodiment of the present invention.

Referring now to FIG. 4, the ILM data packet bundle 84 that comprise the number of blocks or modules is shown. These blocks or modules are software, hardware, firmware, and/or the combination of software, hardware, and/or firmware. The ILM data packet bundle 84 is comprised of bundle overhead 88, the globally distributed time stamp 92, the signal unit 96 and a time offset stamp 94. The time offset stamp 94 represents the difference in time between the globally distributed time stamped at the beginning of refill of the ILM data packet bundle and the local time that the individual signal unit was written to the ILM data packet bundle. The host processor 82 transmits the globally distributed time 90 to annotate the globally distributed time stamp 92 at the beginning of assembly of the ILM data packet bundle. The globally distributed time 90 is also referred to as full globally distributed time, and the globally distributed time stamp 92 is also referred to as the globally distributed time stamp. The bundle overhead 88 added to the ILM data packet bundle contains level 2 information for sequencing and error checking. The monitoring function 86 adds the time offset stamps 94, 98 and 102 based on the time offsets 106, 108 and 110 to the ILM data packet bundle. The order of the time offset stamps and the signal units can vary. The context of the signal units are written to the bundle overhead.

Figure 5:
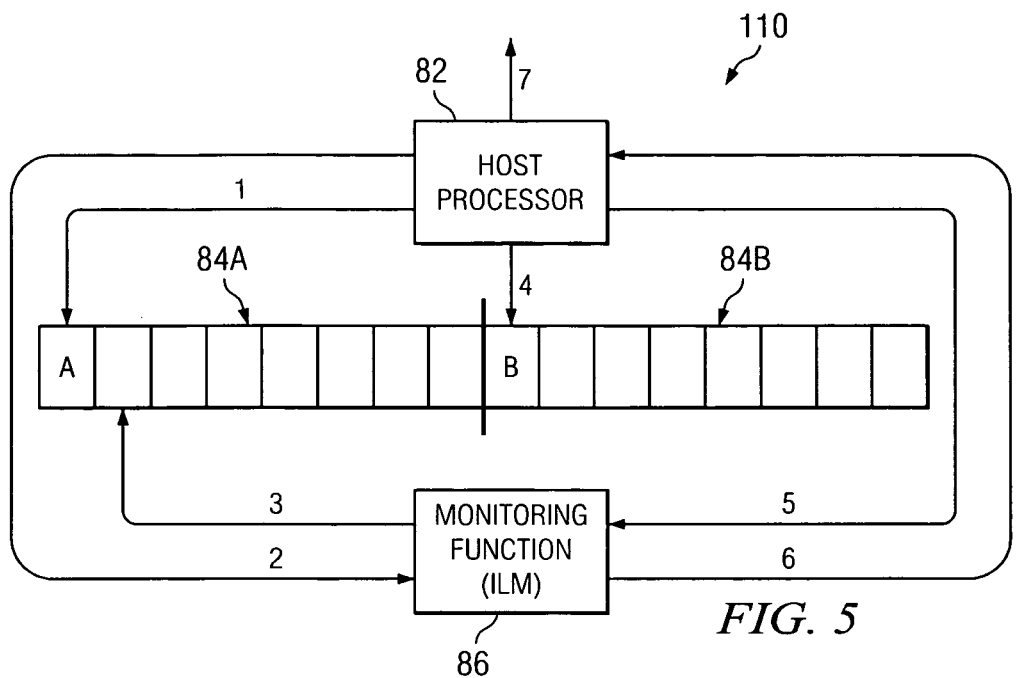
FIG. 5 depicts an integrated link monitor, integrated link monitor data packet bundle and host processor in accordance with a preferred embodiment of the present invention.

Referring now to FIG. 5, the transfer of ILM data packet bundles release portion 84A and refill portion 84B between the host processor 82 and the monitoring function 86 that comprise the number of blocks or modules will be described. These blocks or modules are software, hardware, firmware, and/or the combination of software, hardware, and/or firmware. The host processor 82 fills 1 the globally distributed time stamp A into ILM data packet bundle release portion 84A being assembled in the refill portion 84B of the circular buffer. The host processor 82 transfers ownership 2 in real-time, near real-time, contemporaneously or independently to the refill portion of the circular buffer to the monitoring function 86. After ownership of the refill portion of the circular buffer is transferred to the monitoring function the timer is queried and the ILM begins to fill 3 the refill portion of the circular buffer with received signal units and time offset stamps utilizing the direct memory access control function for copied signal units. The ILM resolves the difference in time between the globally distributed time stamp and the local time the signal unit was written to the refill portion of the circular buffer. The ILM assigns the time offset for the signal unit. The ILM extracts level 2 data associated with the signal unit. The release portion of the circular buffer is released 4 to the host processor 82 while the refill portion of the circular buffer is under ownership of the ILM. Bundle overhead is assigned by the ILM and includes decoding information, information related to unbundling and source of the signal unit related information. The integrated link monitor data packet is bundled including the globally distributed time, the signal unit, time offset and bundle overhead. The refill portion of the circular buffer is loaded with the received signal unit, the assigned time offset and the bundle overhead. After the information in the release portion of the circular buffer is transferred to the host processor, ownership of the release portion of the circular buffer is transferred 5 to the monitoring function 86. The releasing of the release portion of the circular buffer to the host processor is in real-time, near real-time, contemporaneously or independently with loading the refill portion of the circular buffer. The notification 6 from the monitoring function 86 is received by the host processor 82 to tell the host processor that the refill portion of the circular buffer is full. The data from the refill portion of the circular buffer to the data capture system is received 7 from the host processor 72. At this point the refill portion of the circular buffer and the release portion of the circular buffer swap functionality in real-time, near real-time, contemporaneously or independently. This system can include multiple circular buffers, integrated link monitors and host processors.

Figure 6:
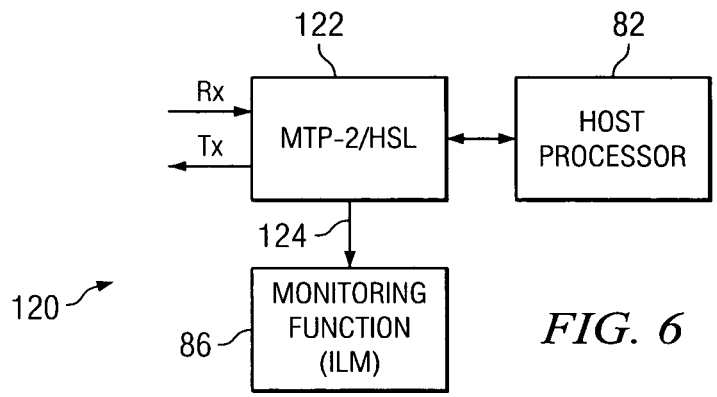
FIG. 6 depicts a context controlled data tap utilizing parallel logic for link monitoring in accordance with a preferred embodiment of the present invention.

Referring now to FIG. 6, the context controlled data tap utilizing parallel logic for link monitoring that comprise a number of blocks or modules is shown. The state machine 122 is shown coupled to the host processor 82 and coupled 124 to the monitoring function 86. These blocks or modules are software, hardware, firmware, and/or a combination of software, hardware, and/or firmware. The virtual tap receives signal units from transmit and receive data links to determine the context of the signal unit aligning the signal unit based upon the state of the current context. The context controlled level 2 state machine scans and extracts the level 2 information and performs level 2 functions. The state machine tap includes information from message transfer part (MTP-2) and high speed link (HSL) information. Bundle overhead is assigned to the signal unit. The context of the associated link is loaded based on the availability of input for the link. Inputs consist of link control from the host processor acting as a controlling entity and requests to generate transmit data or requests to process receive data from the monitoring function

86. The input is applied to the level 2 state machine which utilizes the current input and context loaded state to produce the next state and associated outputs. The processing is performed real-time or near real-time for the associated input. The integrated link monitoring function provides a parallel logic path to copy transmit and receive ILM data packet bundles. Utilizing visibility into the state of the current context, signal unit alignment is maintained for the copied data. Aligned signal units are copied to the direct memory access (DMA) control function for assembling ILM data packet bundles to be stored in host memory. The ILM data packet bundles are assigned bundle overhead for the signal unit.

Figure 7:
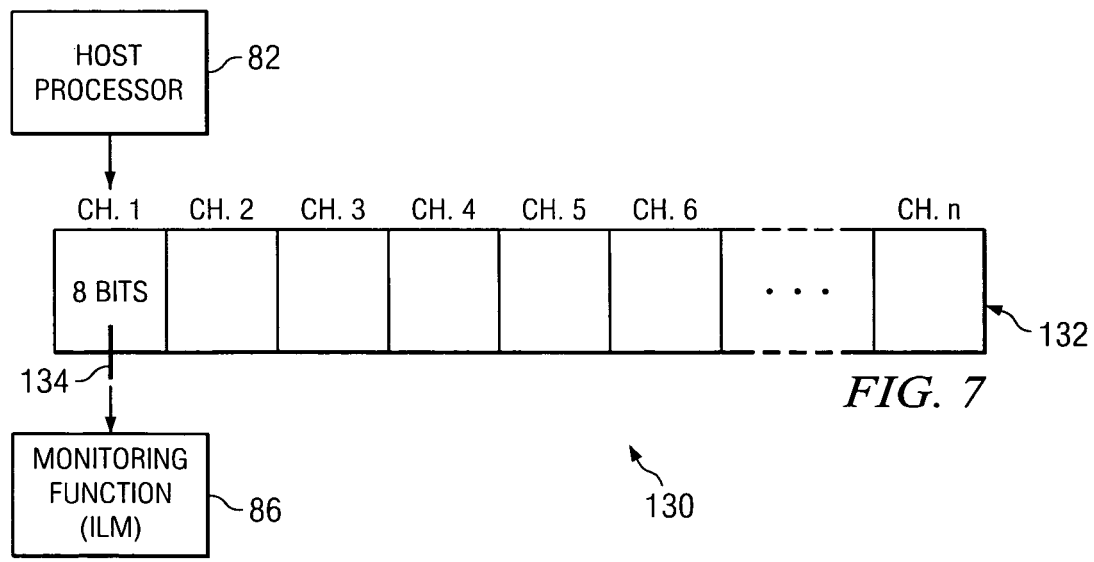
FIG. 7 depicts an integrated link monitor in accordance with a preferred embodiment of the present invention.

Referring now to FIG. 7, the monitoring function 86 and host processor 82 that comprise a number of blocks or modules are shown in relation to the data stream 132 in accordance with the preferred embodiment of the invention. These blocks or modules are software, hardware, firmware, and/or a combination of software, hardware, and/or firmware. The virtual tap 134 of transmit and receive data links allows identification of signal unit source, as an example channel 1 for the monitoring function 86. The context of the associated link is loaded based on the availability of the input for the link. Inputs consist of link control from the host processor 82 acting as the controlling entity and requests to generate transmit data or requests to process receive data from the monitoring function 86. The input is applied to the level 2 state machine which utilizes the current input and context loaded state to produce the next state and associated outputs. The processing is performed real-time or near real-time for the associated input. The integrated link monitoring function provides a parallel logic path to extract source information for signal unit alignment.

Figure 8:
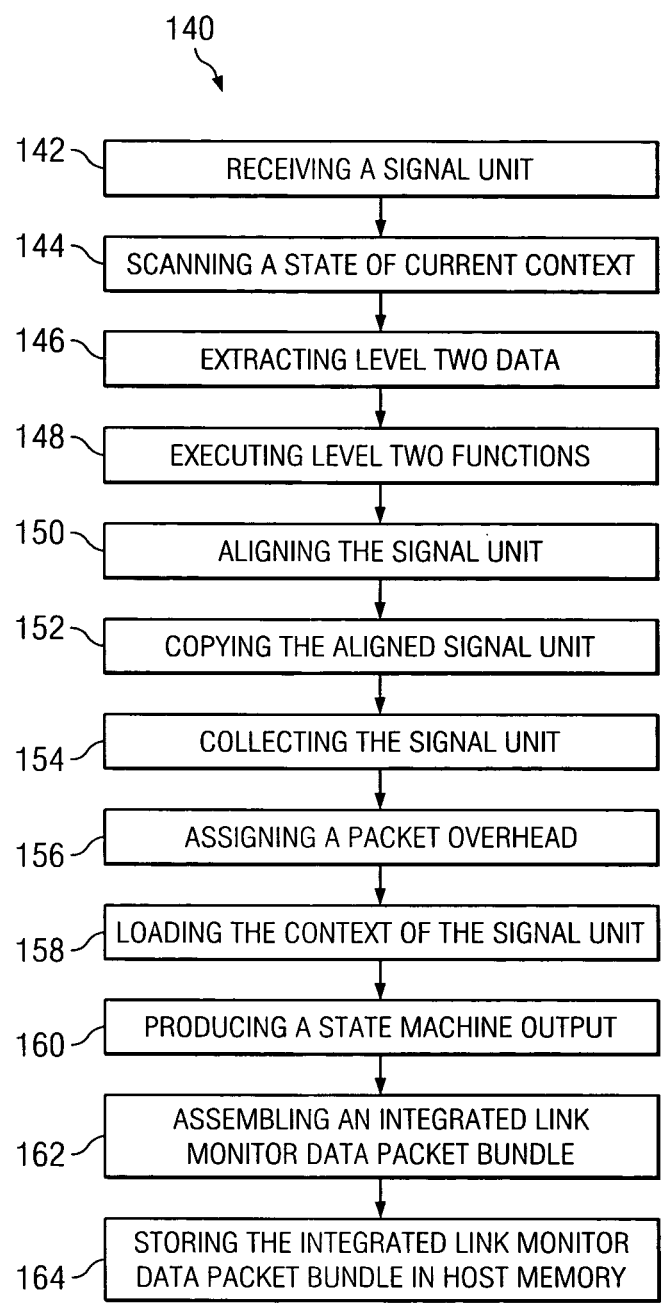
FIG. 8 depicts a flow chart for processing link monitor data in accordance with a preferred embodiment of the present invention.

Referring now to FIG. 8, a method 140 for context controlled data tapping utilizing parallel logic for integrated link monitoring is shown and includes receiving 142 the signal unit and indexing 144 to a state of a current context of the signal unit. The determination is performed in parallel to host processing. Level 2 data is extracted 146 from the signal unit and level 2 functions are executed 148. The signal unit is aligned 150 based upon the state of the current context. The aligned signal unit is copied 152 to the direct memory access control function and the signal unit is collected 154 and assigned 156 the bundle overhead associated with the signal unit. The context of the signal unit is loaded 158 based upon the availability of the link input, wherein link inputs are comprised of requests from the controlling entity, requests to generate the transmit signal unit and requests to process the receive signal unit. The state machine produces 160 output based upon the link input and the current context of the state signal. The integrated link monitor data packet bundle is assembled 162 and stored 164 in host memory.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the management processor, first server or network processor modules. Also, these capabilities may be performed in the current manner or in a distributed manner and on, or via, any device able to extract level 2 information and perform level 2 functions. Further, although depicted in a particular manner, various blocks may be repositioned without departing from the scope of the current invention. For example, the management processor could be integrated within the SS7 link cards. Still further, although depicted in a particular manner, a greater or lesser number of SS7 link cards, management processors, message transport networks, integrated link monitors, hubs, network processors, local area networks or first servers could be utilized.

Further, a lesser or greater number of integrated link monitor data packet bundles may be utilized with the present invention and such data packet bundles may include complementary information in order to accomplish the present invention, to provide additional features to the present invention, and/or to make the present invention more efficient.

What is claimed is:

1. A method for context controlled data tapping utilizing parallel logic for integrated link monitoring, comprising:
    receiving a signal unit from a host processor;
    extracting a context-controlled signal unit from the host processor by a state system;
    indexing to a state associated with a current channel to determine a current context in parallel to host processing;
    assigning a bundle overhead associated with the signal unit, wherein the bundle overhead includes time stamp information for indicating a time offset representing a time difference between a globally distributed time and a local time when the signal unit is written to the bundle overhead of a packet bundle, the time stamp being written to the bundle overhead prior to transferring ownership of the packet bundle; and
    storing via a protocol the bundle overhead associated with the signal unit in a host memory.

2. The method of claim 1 comprising bundling a data packet associated with the integrated link monitor with the signal unit information and the bundle overhead.

3. The method of claim 2 comprising storing the bundled integrated link monitor data packet in THE host memory.

4. The method of claim 1 comprising collecting the signal unit.

5. The method of claim 1 comprising aligning the signal unit based upon the state of the current context.

6. The method of claim 5, wherein the aligned signal unit is copied to a direct memory access control function.

7. The method of claim 1 comprising extracting level 2 information from the signal unit.

8. The method of claim 1 comprising loading the context of the signal unit based upon the availability of a link input.

9. The method of claim 8, wherein link input includes requests from a controlling entity.

10. The method of claim 8, wherein link input includes requests to generate a transmit signal unit.

11. The method of claim 8, wherein link input includes requests to process a receive signal unit.

12. The method of claim 1 comprising producing a state machine output based upon the link input and the current context of the state signal.

13. The method of claim 1, wherein the bundle overhead includes decoding information.

14. The method of claim 1, wherein the bundle overhead includes information related to unbundling.

15. The method of claim 1, wherein the bundle overhead includes source of the signal unit.

16. A method for context controlled data tapping utilizing parallel logic for integrated link monitoring, comprising:
    receiving a signal unit;
    indexing to a state associated with a current channel to determine a current context in parallel to host processing from a host processor;

extracting level 2 data from the signal unit from the host processor by a state system;

aligning the signal unit based upon the state of the current context and the extracted level 2 data;

copying the aligned signal unit to a direct memory access control function of the state system;

collecting the signal unit;

assigning a bundle overhead associated with the signal unit, wherein the bundle overhead includes time stamp information for indicating a time offset representing a time difference between a globally distributed time and a local time when the signal unit is written to the bundle overhead of an integrated link monitor data packet bundle, the time stamp being written to the bundle overhead prior to transferring ownership of the integrated link monitor data packet bundle;

loading the context of the signal unit based upon the availability of a link input, wherein link inputs are comprised of requests from a controlling entity, wherein link inputs are comprised of requests to generate a transmit signal unit, wherein link inputs are comprised of requests to process a receive signal unit;

producing a state machine output based upon the link input and the current context of the state signals;

assembling the integrated link monitor data packet bundle; and storing via a protocol the integrated link monitor data packet bundle in a host memory.

17. A system configured to provide context controlled data tap and parallel logic system for integrated link monitoring, comprising:

a tap receiving a signal unit;

a processor for:

assigning a bundle overhead associated with the signal unit, wherein the bundle overhead includes time stamp information for indicating a time offset representing a time difference between a globally distributed time and a local time when the signal unit is written to the bundle overhead of a packet bundle, the time stamp being written to the bundle overhead prior to transferring ownership of the packet bundle, and loading a context of the signal unit based upon the availability of a link input; and a state machine coupled to the tap, the state machine configured to receive the signal unit and to determine a current context of the signal unit, the state machine producing a subsequent state based on the signal unit input, the link input, and current context of the signal unit.

18. A system configured to provide context controlled data tap and parallel logic system for integrated link monitoring of claim 17 comprising:

a link control coupled to the state machine for controlling input of the signal unit, the link control including coupling to a controlling entity, the link control adapted to receive requests to generate transmit integrated link monitor data packet bundles, the link control adapted to receive requests to process receive integrated link monitor data packet bundles.

19. A non-transitory computer readable storage medium encoded with instructions capable of being executed by a computer, the instructions comprising:

indexing to a state associated with a current channel a signal unit to determine a current context state;

aligning the signal unit based upon the current context;

assigning a bundle overhead associated with the signal unit, wherein the bundle overhead includes time stamp information for indicating a time offset representing a time difference between a globally distributed time and a local time when the signal unit is written to the bundle overhead of a packet bundle, the time stamp being written to the bundle overhead prior to transferring ownership of the packet bundle;

copying the aligned signal unit to a direct memory access control function; and bundling an integrated link monitor data packet in a host memory.

20. A non-transitory computer readable storage medium of claim 19, wherein the bundle overhead associated with the signal unit includes decoding information, unbundling information, source of the data and time stamp information for correlation across multiple monitored entities.

* * * * *